United States Patent [19]

Thorn

[11] Patent Number: 4,627,567
[45] Date of Patent: Dec. 9, 1986

[54] PIVOTAL SLIDE VALVE

[75] Inventor: Walter Thorn, Friedrichshafen, Fed. Rep. of Germany

[73] Assignee: MTU Friedrichshafen GmbH, Friedrichshafen, Fed. Rep. of Germany

[21] Appl. No.: 774,456

[22] Filed: Sep. 10, 1985

[30] Foreign Application Priority Data

Dec. 4, 1984 [DE] Fed. Rep. of Germany ....... 3444417

[51] Int. Cl.[4] .................... F01P 7/16; F16K 11/052
[52] U.S. Cl. ........................ 236/34.5; 137/625.44; 137/875; 251/163; 251/158; 251/228; 251/229; 123/41.1
[58] Field of Search ............. 137/625.44, 875, 876, 137/330, 625.45; 251/162, 163, 228, 229, 177; 236/34.5, 101 A, 101 C, 101 E, 101 R; 123/41.08, 41.09, 41.07, 41.02, 41.1

[56] References Cited

U.S. PATENT DOCUMENTS 2,934,310  4/1960  Kinney et al. ................ 251/163
3,613,732  11/1971  Willson ..................... 137/625.44

FOREIGN PATENT DOCUMENTS 2528714  1/1977  Fed. Rep. of Germany ...... 251/228
3032653  3/1982  Fed. Rep. of Germany .

*Primary Examiner*—Martin P. Schwadron
*Assistant Examiner*—John S. Starsiak, Jr.
*Attorney, Agent, or Firm*—Barnes & Thornburg

[57] ABSTRACT

A pivotal slide valve for the temperature-dependent regulation of the through flow of a cooling medium, in which for avoiding friction losses, a slight gap is provided between the sealing surface of the pivotal slide valve member and the sealing surface of the housing. For achieving a complete tightness, the pivotal slide valve member is pressed against the sealing surface of the housing when the cooling medium is cold. This is achieved by a corresponding construction of the valve parts between the temperature-dependent working element and the pivotal slide valve member.

12 Claims, 4 Drawing Figures

PIVOTAL SLIDE VALVE

The present invention relates to a pivotal slide valve for the temperature-dependent regulation of the through-flow of a medium, especially for the control of the cooling medium through-flow for an internal combustion engine, consisting of a valve housing with one inlet and two outlet openings, of a closure member constructed as pivotal slide valve member and supported on a shaft, of a temperature-dependent working element which is circumcirculated by the cooling medium and supported at the valve housing, and of a counter-abutment for the working element arranged between the working element and the pivotal slide valve member.

Such a pivotal slide valve is disclosed in the DE-OS 30 32 653 and has the purpose in internal combustion engines to conduct the cooling medium directly to the internal combustion engine at low cooling medium temperatures, to control the same increasingly through the radiator with a warming-up cooling medium, and finally to close off the direct in-flow to the internal combustion engine upon reaching the operating temperature so that the entire cooling medium flow is then conducted at first into the radiator and only thereafter from the radiator to the internal combustion engine.

In order to keep low the work capacity of the working element necessary for the movement of the pivotal slide valve member, a slight gap is provided in the known arrangement between the pivotal slide valve member and the sealing surface of the valve housing. As a result thereof, the friction to be overcome by the working element at the sealing surfaces is avoided. However, a leakage quantity of the cooling medium results from the gap, which is disadvantageous especially at cold operating condition because the leakage quantity flows through the radiator and therewith counteracts the desired rapid warm-up of the internal combustion engine.

It is the principal object of the present invention to prevent the through-flow of the cooling medium through the radiator with a cold cooling medium, which is conditioned by the gap. However, an increase of the work capacity of the working element should not become necessary and the uniform and shock-free adjustment of the known pivotal slide valve member is to be preserved.

The underlying problems are solved according to the present invention in that the counter-abutment is pivotally supported in a lug securely connected with the shaft, in that the lug is provided with an adjustable stop for the pivotal slide valve member and in that the shaft includes two eccentric shaft stubs, by means of which it is supported in bearing places connected with the valve housing.

Owing to these measures, the pivotal slide valve member is pressed against the sealing surface of the valve housing when the cooling medium is cold. As a result thereof, a far-reaching tightness and therewith a rapid initial warm-up of the internal combustion engine can be assured. With the beginning of the stroke of the working element during the warm-up of the cooling medium, at first this pressing-on action is removed without pivoting the pivotal slide valve member and a gap is established between the sealing surfaces. A leakage through-flow through the radiator begins therewith. During the further warm-up, the pivotal slide valve member is adjusted in a known manner nearly frictionless.

The tightness is increased when the pivotal slide valve member is pressed against the sealing surface, in that the pivotal slide valve member is coated at its sealing surface with an elastomer. Owing to this feature, the dimensional tolerances of valve housing and pivotal slide valve member can additionally be determined more generously.

These and other objects, features and advantages of the present invention will become more apparent from the following description when taken in connection with the accompanying drawing which shows, for purposes of illustration only, one embodiment in accordance with the present invention, and wherein.

Figure 1:
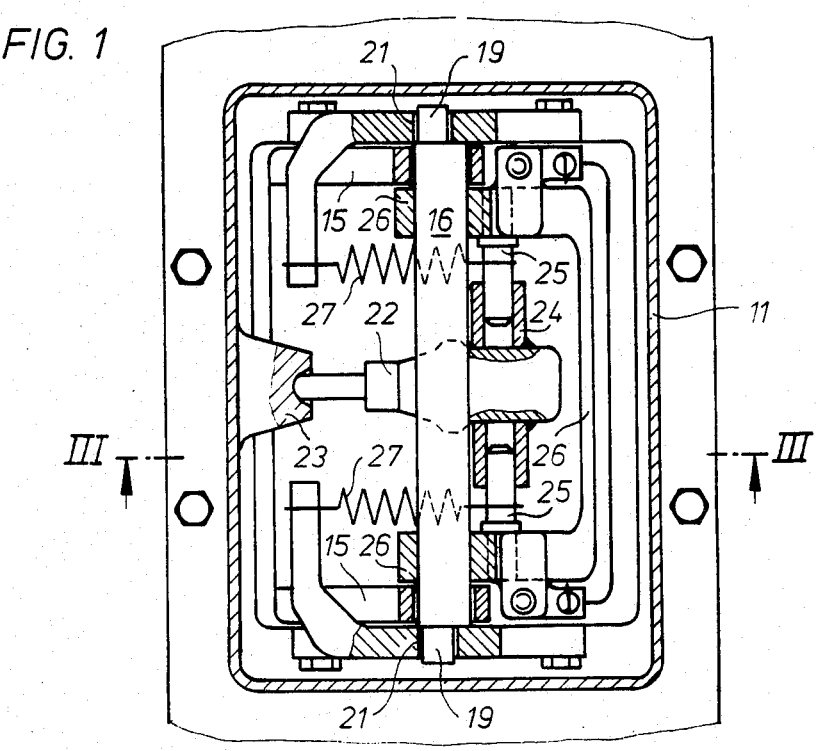
FIG. 1 is a top plan view on a pivotal slide valve in accordance with the present invention.

Referring now to the drawing wherein like reference numerals are used throughout the various views to designate like parts, the pivotal slide valve includes a valve housing 11 having a cooling medium inlet 12, a cooling medium outlet 13 leading to a radiator, and a cooling medium outlet 14 leading to an internal combustion engine. A valve closure member of the pivotal slide valve, which is constructed as pivotal slide valve member 15, is pivotally supported on a shaft 16. The pivotal slide valve member 15 more or less closes off the two cooling medium outlets 13 and 14 of the pivotal slide valve depending on its position and is coated at its sealing surface with an elastomer 17. A stop 18 limits the travel of the pivotal slide valve member 15 in the one direction. The shaft 16 includes at its two ends an eccentric stub shaft 19, by means of which it is supported in bearing places 21 connected with the valve housing 11. A temperature-dependent working element 22 is circumcirculated by the cooling medium and is supported at the valve housing 11 in a bearing support 23. A counter-abutment 24 for the working element 22 is arranged between the working element 22 and the pivotal slide valve member 15. This counter-abutment 24 is supported in a lug 26 securely connected with the shaft 16 by way of pins 25 and presses the working element 22 against its bearing support 23 by means of draw springs 27.

The lug 26 is provided with an adjustable stop 28 for the pivotal slide valve member 15. The pivotal slide valve member 15 is pressed against its stop 18 by way of a draw spring 29 when the cooling medium is cold.

OPERATION

Figure 2:
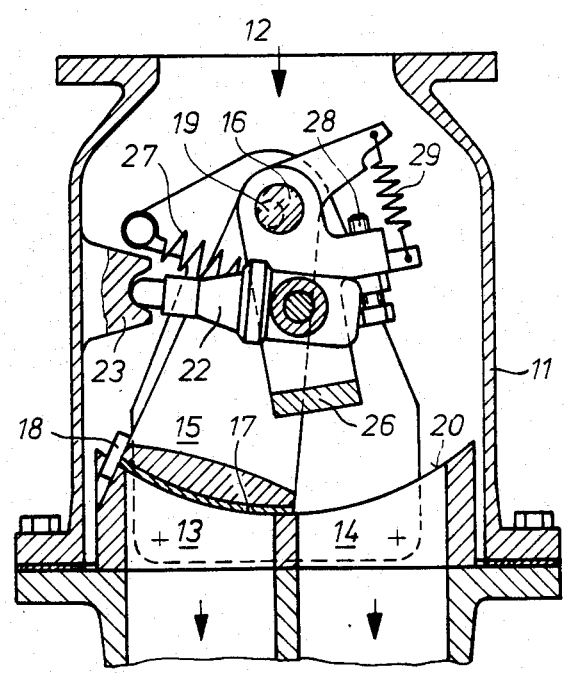
FIGS. 2 to 4 are cross-sectional views, taken along line III—III, through a pivotal slide valve in the cold condition, shortly prior to reaching the operating temperature and at the operating temperature.

In FIG. 2, the working element 22 has its shortest length. This corresponds to a cold cooling medium, for example, shortly after starting the internal combustion engine. In the corresponding position of the lug 26 and of the shaft 16 securely connected therewith, the shaft 16 is displaced downwardly by its eccentric shaft stubs 19 and thereby presses the pivotal slide valve member 15 with its elastomer 17 against a sealing surface 20 of the valve housing 11. As a result thereof, the cooling medium outlet 13 leading to the radiator is tightly closed, and the cooling medium flows from the cooling medium inlet 12 past the working element 22 by way of the cooling medium outlet 14 directly to the internal combustion engine. Because the cooling medium through-flow through the radiator is therewith completely interrupted, the internal combustion engine can warm-up rapidly.

Figure 3:
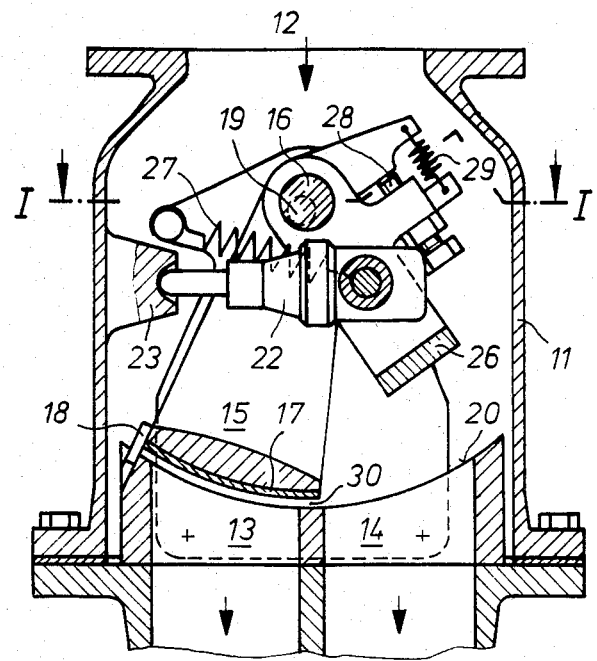

Owing to the warm-up of the cooling medium connected therewith, the working element 22 commences to increase its length. As a result thereof, only the shaft 16 connected therewith is rotated by way of the lug 26 and a lifting-off of the pivotal slide valve member 5 from the sealing surface 20 of the valve housing 11 is effected by the eccentric shaft stubs 19 (FIG. 3).

A cooling medium leakage through-flow through the radiator commences to form through the gap 30 resulting therefrom. The further temperature increase of the internal combustion engine and of the cooling medium flattens out as a result thereof. The design of the working element 22 and the position of the eccentricity of the shaft stubs 19 is so determined that this flattening-out of the temperature increase starts only shortly prior to reaching the operating temperature.

Figure 4:
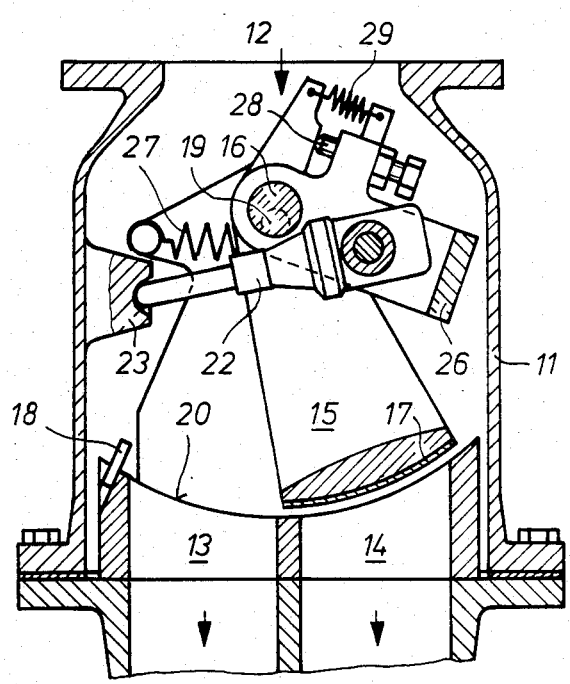

After the pivotal slide valve member 15 has lifted off from the sealing surface 20 of the valve housing 11, the stop 28 of the lug 26 comes into abutment at the pivotal slide valve member 15. During a further temperature increase of the cooling medium and an expansion of the working element 22 conditioned thereby, the pivotal slide valve member 15 is pivoted in a known manner, increasingly opens thereby the cooling medium outlet 13 to the radiator and simultaneously increasingly closes the cooling medium outlet 14 to the internal combustion engine until corresponding to FIG. 4 it has completely opened the path for the cooling medium by way of the radiator at the operating temperature or at higher temperatures and simultaneously has nearly closed off the direct in-flow to the internal combustion engine. The beginning of the pivotal movement can be coordinated to a predetermined temperature of the cooling medium by the adjustable stop 28.

After turning-off the internal combustion engine, the temperature of the internal combustion engine and of the cooling medium again drops off to the surrounding temperature as a result of heat radiation.

As a result thereof, the length of the working element 22 is again reduced to the length illustrated in FIG. 2. Correspondingly, also the pivotal slide valve member 15 is at first pivoted up to the abutment 18 and thereafter is lowered onto the sealing surface 20 of the valve housing 11 by rotation of the shaft 16. The cooling medium outlet 13 leading to the radiator is thereby tightly closed for the next starting operation and for a rapid temperature rise of the internal combustion engine.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pivotal slide valve for the temperature-dependent control of the through-flow of a cooling medium, comprising valve housing means provided with an inlet and two outlet openings, a closure member constructed as pivotal slide valve member pivotable to control the flow through the two outlets and supported on a shaft, the shaft being eccentrically supported in the valve housing means by way of bearing means connected with the valve housing means, a valve actuating working element in the valve housing which is circumcirculated by the cooling medium and supported at the valve housing means, and counter-abutment means in the housing attached to and movable by the working element, said counter-abutment means being supported in a lug means securely connected with said shaft, the lug means being provided with an adjustable stop means for connecting and driving the pivotal slide valve member between the two outlets after a predetermined movement of the counter-abutment means.

2. A pivotal slide valve according to claim 1, wherein the pivotal slide valve member is provided with an elastomer at its sealing surface.

3. A pivotal slide valve according to claim 2, wherein the shaft includes two eccentric shaft stubs, by way of which the shaft is supported in the bearing means.

4. A pivotal slide valve according to claim 3, wherein the pivotal slide valve member controls the cooling medium through-flow for an internal combustion engine by connecting the inlet with the first outlet allowing flow medium to proceed to an engine to be cooled thereby and by connecting the inlet to the second outlet allowing the flow medium to proceed to a radiator for cooling of the flow medium.

5. A pivotal slide valve according to claim 1, wherein the shaft includes two eccentric shaft stubs, by way of which the shaft is supported in the bearing means.

6. A pivotal slide valve according to claim 1, wherein the pivotal slide valve member controls the cooling medium through-flow for an internal combustion engine by connecting the inlet with the first outlet allowing flow medium to proceed to an engine to be cooled thereby and by connecting the inlet to the second outlet allowing the flow medium to proceed to a radiator for cooling of the flow medium.

7. A pivotal slide valve according to claim 1, wherein the working element is expandable, and when expanded from a first position to a second position, the counter-abutment means rotates the shaft causing the shaft to move away from the outlet openings because of the eccentric mounting of the shaft in the housing, and wherein the closure member supported on the shaft is likewise moved away from the outlet openings.

8. A pivotal slide valve according to claim 7, wherein the working element is further expandable from the second position towards a third limit position to cause the adjustable stop means to contact and pivot the closure member from one outlet opening to the other outlet opening.

9. A pivotal valve element according to claim 1, wherein the working element is temperature responsive to the cooling medium to expand and move the counter-abutment means in response to a heating of the cooling medium.

10. A pivotal valve element according to claim 6, wherein the working element is temperature responsive to the cooling medium to expand and move the counter-abutment means in response to a heating of the cooling medium.

11. A pivotal valve element according to claim 7, wherein the working element is temperature responsive to the cooling medium to expand and move the counter-abutment means in response to a heating of the cooling medium.

12. A pivotal valve element according to claim 8, wherein the working element is temperature responsive to the cooling medium to expand and move the counter-abutment means in response to a heating of the cooling medium.

* * * * *